US012713046B2

(12) United States Patent
Wenger

(10) Patent No.: US 12,713,046 B2
(45) Date of Patent: Aug. 18, 2026

(54) SEI MESSAGE SUPPORTING DECODER PICTURE-BASED PARALLELIZATION

(71) Applicant: Tencent America LLC, Palo Alto, CA (US)

(72) Inventor: Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/904,722

(22) Filed: Oct. 2, 2024

(65) Prior Publication Data

US 2025/0119567 A1 Apr. 10, 2025

Related U.S. Application Data

(60) Provisional application No. 63/542,737, filed on Oct. 5, 2023.

(51) Int. Cl.
*H04N 19/44* (2014.01)
*H04N 19/172* (2014.01)
*H04N 19/70* (2014.01)

(52) U.S. Cl.
CPC ........... *H04N 19/44* (2014.11); *H04N 19/172* (2014.11); *H04N 19/70* (2014.11)

(58) Field of Classification Search
None
See application file for complete search history.

(56) References Cited

U.S. PATENT DOCUMENTS 9,113,172 B2 * 8/2015 Hong .................. H04N 19/172
10,547,834 B2 * 1/2020 Wang .................... H04N 19/30
11,509,914 B2 * 11/2022 Kim .................... H04N 19/124
2006/0256851 A1 11/2006 Wang et al.
2009/0106812 A1 * 4/2009 Rodriguez ..... H04N 21/440218 725/131
2009/0232199 A1 * 9/2009 Kobayashi ............ H04N 19/46 375/E7.026
2012/0044322 A1 * 2/2012 Tian ...................... H04N 19/70 348/E13.001
2014/0050458 A1 * 2/2014 Mochinaga ............. H04N 5/85 386/239
2014/0086336 A1 * 3/2014 Wang .................. H04N 19/149 375/240.26

(Continued)

OTHER PUBLICATIONS

Boyce et al. "Additional SEI messages for VSEI (Draft 3)", Joint Video Experts Team (JVET) Document JVET-V20006-v1, 22nd Meeting, by teleconference, Apr. 20-28, 2021.*

(Continued)

*Primary Examiner* — Stefan Gadomski
(74) *Attorney, Agent, or Firm* — Sughrue Mion, PLLC

(57) ABSTRACT

A method and apparatus comprising computer code configured to cause a processor or processors to obtain video data including at least a first coded picture and a second coded picture, identify, by a decoder, at least one syntax element in a supplementary information enhancement (SEI) message indicating that the second coded picture is to be decoded independently from the first picture, and decode the second coded picture independently from the first coded picture based on the at least one syntax element in the SEI message.

20 Claims, 18 Drawing Sheets

1300

| inter_picture_dependency(payloadSize) { | C | Descriptor |
|---|---|---|
| **ipd_update_flag** | 5 | u(1) |
| if(ipd_update_flag) { | | |
| **simultaneous_decoded_picture_minus1** | 5 | ue(v) |
| } | | |
| **current_picture_dependency_id** | 5 | ue(v) |
| } | | |

(56) References Cited

U.S. PATENT DOCUMENTS

2015/0195555 A1* 7/2015 Hendry .................. H04N 19/30 375/240.16
2015/0271525 A1* 9/2015 Hendry ................ H04N 19/107 375/240.27
2016/0142722 A1* 5/2016 Maeda ................. H04N 19/187 375/240.08
2016/0173890 A1* 6/2016 Hattori ................... H04N 19/70 375/240.25
2016/0219301 A1* 7/2016 Pettersson .............. H04N 19/31
2016/0219306 A1* 7/2016 Pettersson .............. H04N 19/70
2016/0373777 A1* 12/2016 Pettersson ............ H04N 19/105
2020/0177923 A1* 6/2020 Chen .................... H04N 19/503
2021/0281880 A1* 9/2021 Litwic .................. H04N 19/184
2021/0337228 A1 10/2021 Wang et al.
2022/0078486 A1* 3/2022 Hannuksela ....... H04N 21/4728
2022/0094909 A1* 3/2022 Hannuksela ......... H04N 19/172
2022/0103847 A1* 3/2022 Wang ..................... H04N 19/91
2022/0103867 A1 3/2022 Wang
2022/0166997 A1* 5/2022 Denoual .......... H04N 21/85406
2022/0217389 A1* 7/2022 Sychev .................. H04N 19/31
2022/0239949 A1* 7/2022 Hannuksela ......... H04N 19/105
2022/0377382 A1* 11/2022 Wang ..................... H04N 19/70
2022/0417544 A1 12/2022 Choi et al.
2023/0209071 A1* 6/2023 Hendry .................. H04N 19/31 375/240.26
2023/0209091 A1* 6/2023 Boyce .................. H04N 19/172 348/43
2024/0146994 A1* 5/2024 He ....................... H04N 21/435
2025/0184501 A1* 6/2025 Shen .................... H04N 19/593

OTHER PUBLICATIONS

International Search Report issued Dec. 30, 2024 in International Application No. PCT/US2024/049927.

Written Opinion of the International Searching Authority issued Dec. 30, 2024 in International Application No. PCT/US2024/049927.

Sjöberg et al., "Overview of HEVC High-Level Syntax and Reference Picture Management", IEEE Transactions on Circuits and Systems for Video Technology, vol. 22, No. 12, Dec. 2012, pp. 1858-1870 (13 Pages total).

* cited by examiner

FIG. 2

FIG. 5
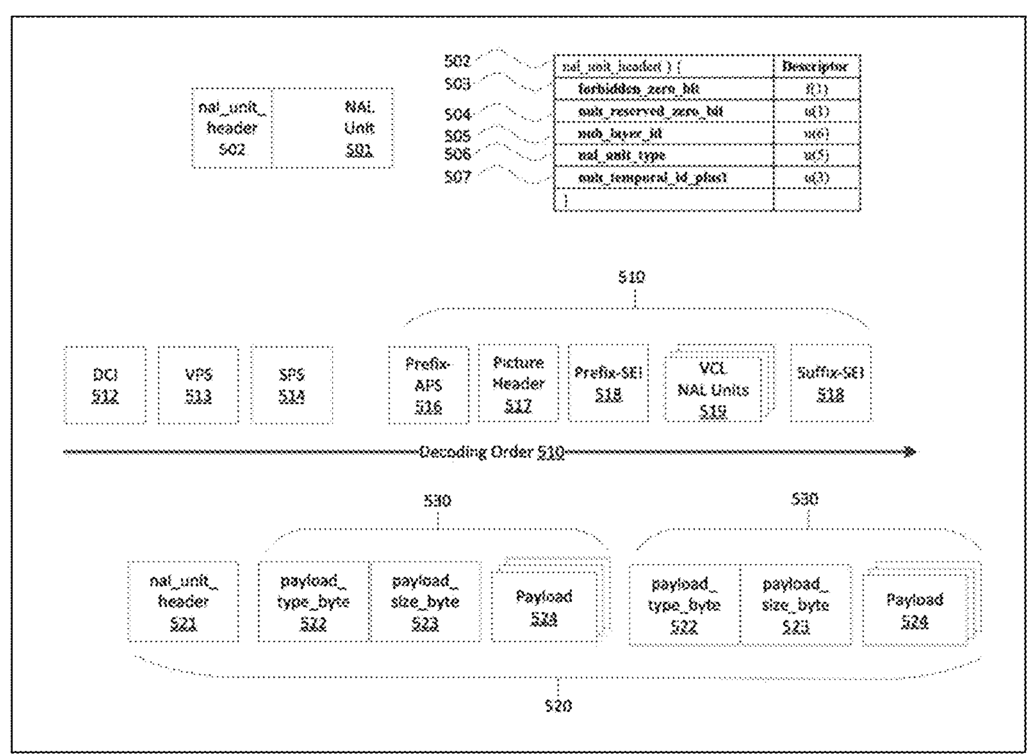

701 8.X.1 Inter picture dependency SEI message syntax

| inter_picture_dependency(payloadSize) { | C | Descriptor |
|---|---|---|
| 702 **ipd_update_flag** | 5 | u(1) |
| if(ipd_update_flag) { | | |
| 703 **simultaneous_decoded_picture_minus1** | 5 | ue(v) |
| } | | |
| 704 **current_picture_independent** | 5 | ue(v) |
| } | | |

FIG. 7B

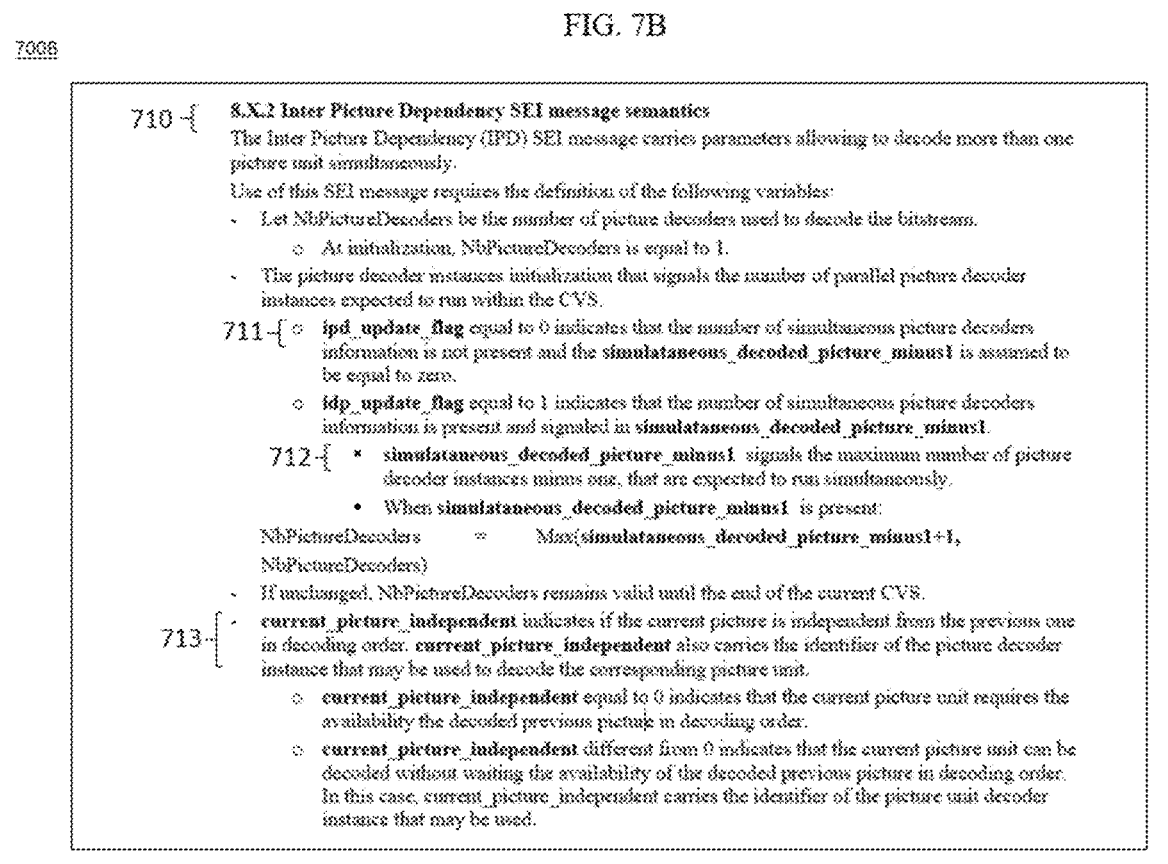

700B 710 8.X.2 Inter Picture Dependency SEI message semantics

The Inter Picture Dependency (IPD) SEI message carries parameters allowing to decode more than one picture unit simultaneously.

Use of this SEI message requires the definition of the following variables:

- Let NbPictureDecoders be the number of picture decoders used to decode the bitstream.
  - At initialization, NbPictureDecoders is equal to 1.
- The picture decoder instances initialization that signals the number of parallel picture decoder instances expected to run within the CVS.
  - 711 ipd_update_flag equal to 0 indicates that the number of simultaneous picture decoders information is not present and the simulataneous_decoded_picture_minus1 is assumed to be equal to zero.
  - idp_update_flag equal to 1 indicates that the number of simultaneous picture decoders information is present and signaled in simulataneous_decoded_picture_minus1.
    - 712 simulataneous_decoded_picture_minus1 signals the maximum number of picture decoder instances minus one, that are expected to run simultaneously.
    - When simulataneous_decoded_picture_minus1 is present:

NbPictureDecoders = Max(simulataneous_decoded_picture_minus1+1, NbPictureDecoders)

- If unchanged, NbPictureDecoders remains valid until the end of the current CVS.
- 713 current_picture_independent indicates if the current picture is independent from the previous one in decoding order. current_picture_independent also carries the identifier of the picture decoder instance that may be used to decode the corresponding picture unit.
  - current_picture_independent equal to 0 indicates that the current picture unit requires the availability the decoded previous picture in decoding order.
  - current_picture_independent different from 0 indicates that the current picture unit can be decoded without waiting the availability of the decoded previous picture in decoding order. In this case, current_picture_independent carries the identifier of the picture unit decoder instance that may be used.

| inter_picture_dependency(payloadSize){ | C | Descriptor |
|---|---|---|
| 902 **ipd_update_flag** | 5 | u(1) |
| if(ipd_update_flag){ | | |
| **simultaneous_decoded_picture_minus1** | 5 | ue(v) |
| } | | |
| 903 **current_picture_serial_number** | 5 | u(8) |
| 904 **picture_dependency_serial_number** | 5 | u(8) |
| } | | |

-Let SerialNumber be a one-byte integer identifier of the picture. At the start of a CVS, the first picture unit is assigned SerialNumber equal to 0. For each following picture in the decoding order in the CVS SerialNumber is incremented by one. A wraparound is applied to SerialNumber so that the following value after 255 is 0.

905 • current_picture_serial_number indicates the serial number of the current picture unit in decoding order required to be decoded before being able to decode the current picture unit.

906 • picture_dependency_serial_number indicates the serial number of the latest picture in decoding order required to be decoded before being able to decode the current picture unit.

| Current picture decoding order | Dependent of latest picture | Parallel decoding with the previous picture | Number of parallel instances of picture decoder |
|---|---|---|---|
| 0 | - | no | 1 |
| 1 | 0 | no | 1 |
| 2 | 1 | no | 1 |
| 3 | 2 | no | 1 |
| 4 | 3 | no | 1 |
| 5 | 4 | no | 1 |
| 6 | 4 | yes | 2 |
| 7 | 3 | yes | 3 |
| 8 | 7 | no | 1 |
| 9 | 7 | yes | 2 |
| 10 | 2 | yes | 3 |
| 11 | 10 | no | 1 |
| 12 | 11 | no | 1 |
| 13 | 11 | yes | 2 |
| 14 | 13 | yes | 3 |
| 15 | 14 | no | 1 |
| 16 | 14 | yes | 2 |

| | t0 | t1 | t2 | t3 | t4 | t5 | t6 | t7 | t8 | t9 |
|---|---|---|---|---|---|---|---|---|---|---|
| Decoder1: | 0 | 1 | 2 | 3 | 4 | 5 | 8 | 11 | 12 | 15 |
| Decoder2: | | | | | | 6 | 9 | | 13 | 16 |
| Decoder3: | | | | | | 7 | 10 | | 14 | |

| inter_picture_dependency(payloadSize) { | C | Descriptor |
|---|---|---|
| **ipd_update_flag** | 5 | u(1) |
| if(ipd_update_flag) { | | |
| **simultaneous_decoded_picture_minus1** | 5 | ue(v) |
| } | | |
| **current_picture_dependency_id** | 5 | ue(v) |
| } | | |

| inter_picture_dependency(payloadSize) { | C | Descriptor |
|---|---|---|
| **ipd_update_flag** | 5 | u(1) |
| if(ipd_update_flag) { | | |
| **simultaneous_decoded_picture_minus1** | 5 | ue(v) |
| } | | |
| **current_picture_dependency_id** | 5 | u(v) |
| } | | |

| inter_picture_dependency(payloadSize) { | C | Descriptor |
|---|---|---|
| **ipd_update_flag** | 5 | u(1) |
| if(ipd_update_flag) { | | |
| **simultaneous_decoded_picture_minus1** | 5 | ue(v) |
| } | | |
| **current_picture_serial_number** | 5 | u(8) |
| **picture_dependency_serial_number** | 5 | u(8) |
| } | | |

| sei_payload( payloadType, payloadSize ) { | *Descriptor* |
|---|---|
| SeiExtensionBitsPresentFlag = 0 | |
| if( nal_unit_type = = PREFIX_SEI_NUT ) | |
| if( payloadType = = 0 ) | |
| buffering_period( payloadSize ) | |
| else if {...} | |
| else if( payloadType = = XXX ) /* Specified in Rec. ITU-T H.274 \| ISO/IEC 23002-7 */ | |
| inter_picture_dependency ( payloadSize ) | |
| else /* nal_unit_type = = SUFFIX_SEI_NUT */ | |
| {...} | |
| if( SeiExtensionBitsPresentFlag \|\| more_data_in_payload( ) ) { | |
| if( payload_extension_present( ) ) | |
| **sei_reserved_payload_extension_data** | u(v) |
| **sei_payload_bit_equal_to_one** /* equal to 1 */ | f(1) |
| while( !byte_aligned( ) ) | |
| **sei_payload_bit_equal_to_zero** /* equal to 0 */ | f(1) |
| } | |
| } | |

Figure 17:
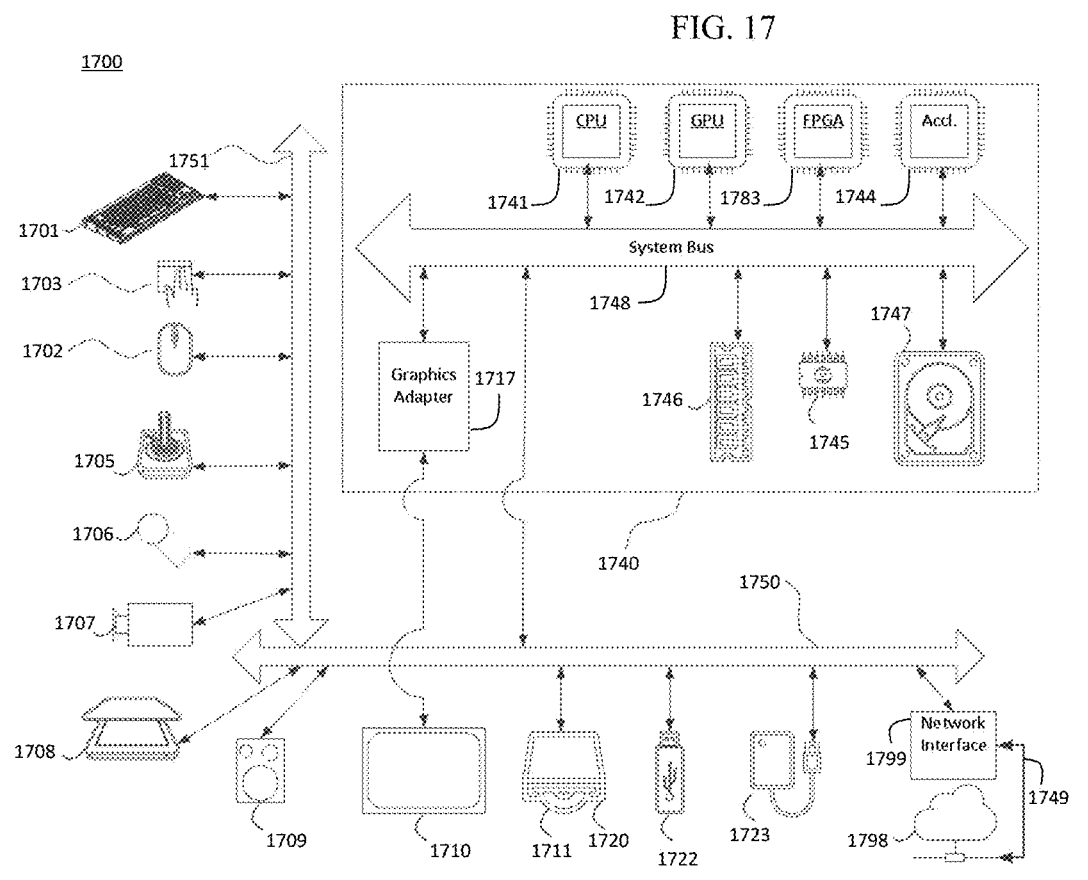

CPU
GPU
FPGA
Accl.
1741
1742
1783
1744
System Bus
1748
1751
1701
1703
1702
Graphics Adapter
1717
1746
1745
1747
1705
1706
1707
1740
1750
1708
1709
1710
1711
1720
1722
1723
Network Interface
1799
1798
1749

SEI MESSAGE SUPPORTING DECODER PICTURE-BASED PARALLELIZATION

CROSS REFERENCE TO RELATED APPLICATION

This application claims priority to U.S. provisional application 63/542,737, filed on Oct. 5, 2023, the disclosure of which is incorporated herein by reference in its entirety.

BACKGROUND

1. Field

The disclosed subject matter relates to video coding and decoding, and more specifically, to Supplementary Enhancement Information (SEI) message supporting picture-based parallelization in a decoder by indicating pictures being independent from previously decoded pictures.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be described below.

Video compression standards historically have included certain tools that enable parallelization of decoding within a coded picture. For example, H.266/VVC includes Wavefront Parallel Processing and Tiles. These tools are designed to break in-picture prediction mechanisms so that parts of a picture under decoding does not rely on other identified parts, thereby allowing independent decoding of those independent parts.

SUMMARY

There is included a method and apparatus comprising memory configured to store computer program code and a processor or processors configured to access the computer program code and operate as instructed by the computer program code. The computer program is configured to cause the processor implement obtaining code configured to cause the at least one processor to obtain video data comprising at least a first coded picture and a second coded picture; identifying code configured to cause the at least one processor to obtain identify, by a decoder, at least one syntax element in a supplementary information enhancement (SEI) message indicating that the second coded picture is to be decoded independently from the first picture; and decoding code configured to cause the at least one processor to decode the second coded picture independently from the first coded picture based on the at least one syntax element in the SEI message.

The SEI message may be included with the second coded picture in the video data.

The decoder may include a plurality of decoders, and decoding the second coded picture independently from the first coded picture based on the at least one syntax element in the SEI message may include a first one of the plurality of decoders decoding the first coded picture and a second one of the plurality of decoders decoding the second coded picture.

The first one of the plurality of decoders may decode the first coded picture in parallel with the second one of the plurality of decoders decoding the second coded picture.

The at least one syntax element in the SEI message may indicate picture dependency and a recommended decoder instance for decoding the second coded picture.

The at least one syntax element in the SEI message may indicate picture dependency based on a picture order count (POC).

The at least one syntax element in the SEI message may indicate picture dependency based on a serial number.

BRIEF DESCRIPTION OF THE DRAWINGS

Further features, nature, and various advantages of the disclosed subject matter will be more apparent from the following detailed description and the accompanying drawings in which:

FIG. 2 is a simplified block diagram of media processing in accordance with embodiments;

FIG. 5 is a simplified illustration of NAL unit and SEI headers in accordance with embodiments;

FIG. 7A is a schematic illustration of an SEI message syntax and semantics in accordance with an embodiment;

FIG. 7B is a schematic illustration of an SEI message syntax and semantics in accordance with an embodiment;

FIG. 9 is a schematic illustration of prediction structures in accordance with an embodiment;

FIG. 11 is a schematic illustration of prediction structures in accordance with an embodiment;

FIG. 13 is a schematic illustration of prediction structures in accordance with an embodiment;

FIG. 14 is a schematic illustration of prediction structures in accordance with an embodiment;

FIG. 15 is a schematic illustration of prediction structures in accordance with an embodiment;

FIG. 16 is a schematic illustration of prediction structures in accordance with an embodiment; and FIG. 17 is a simplified diagram of computer features in accordance with embodiments.

DETAILED DESCRIPTION

Within a coded video sequence, pictures can be created such that they do not depend on certain other pictures, which would allow parallel decoding after analyzing the bitstream so to identify independently decodable pictures. However, a dispatcher that allocates one of multiple decoders to decode one or more independently decodable pictures, or groups thereof, in a coded video sequence currently needs to analyze an H.266 bitstream (or bitstreams according to other video coding standards or technologies) to identify such pictures. Such an identification mechanism should preferably easily parseable so that no deep analysis of a bitstream is required.

The disclosed subject matter comprises a method for video decoding of a coded video sequence executed by at least one processor, the method comprising receiving a first coded picture; receiving a second coded picture; wherein the second coded picture comprises a Supplementary Enhancement Information (SEI) message indicating that the second picture can be decoded independently from the first picture. The knowledge of independence of first and second coded picture can be used, for example, to enable parallel decoding by, for example, multiple independent decoders, of the first and second picture.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

In the context of the video coding for machines project ongoing in JVET and MPEG, a mechanism is required that maintains the basic syntax structure of video codec specifications such as Versatile Video Coding (H.266/VVC), can enhance the syntax of the video codec ideally without involving a change in the syntax of H.266 itself (or, at least not in a major way), and still allows changes in the decoding process.

Figure 1:
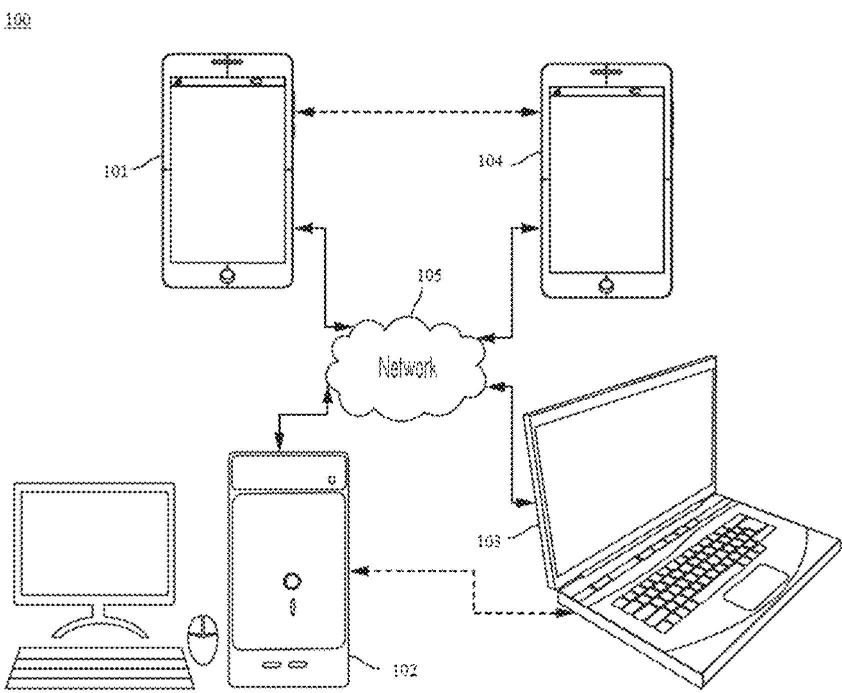
FIG. 1 is a schematic illustration of a computer environment in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below. The network 105 may include Media Aware Network Elements (MANEs) that may be included in the transmission path between, for example, terminal 101 and 104. The purpose of a MANE may be selective forwarding of parts of the media data to react to network congestions, media switching, media mixing, archival, and similar tasks commonly performed by a service provider rather than an end user. Such MANEs may be able to parse and react on a limited part of the media conveyed over the network, for example syntax elements related to the network abstraction layer of video coding technologies or standards.

Figure 2:
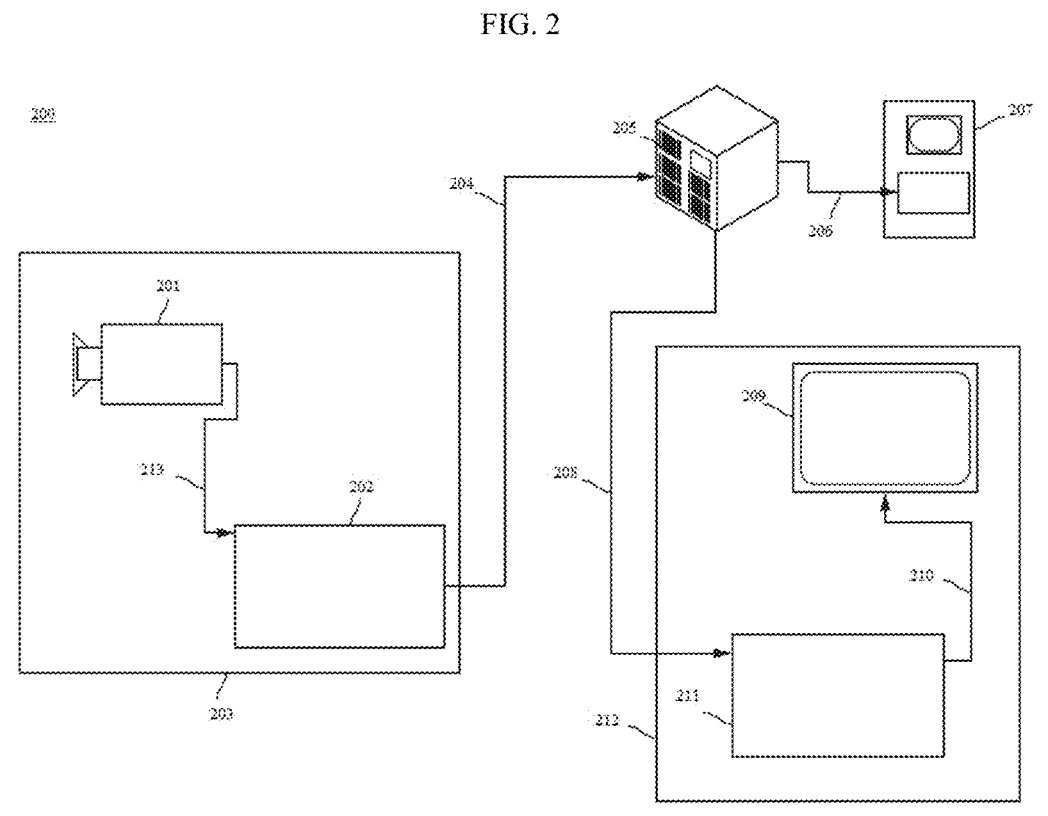

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein. Examples of those standards include ITU-T Recommendations H.265 and H.266. The disclosed subject matter may be used in the context of VVC.

Figure 3:
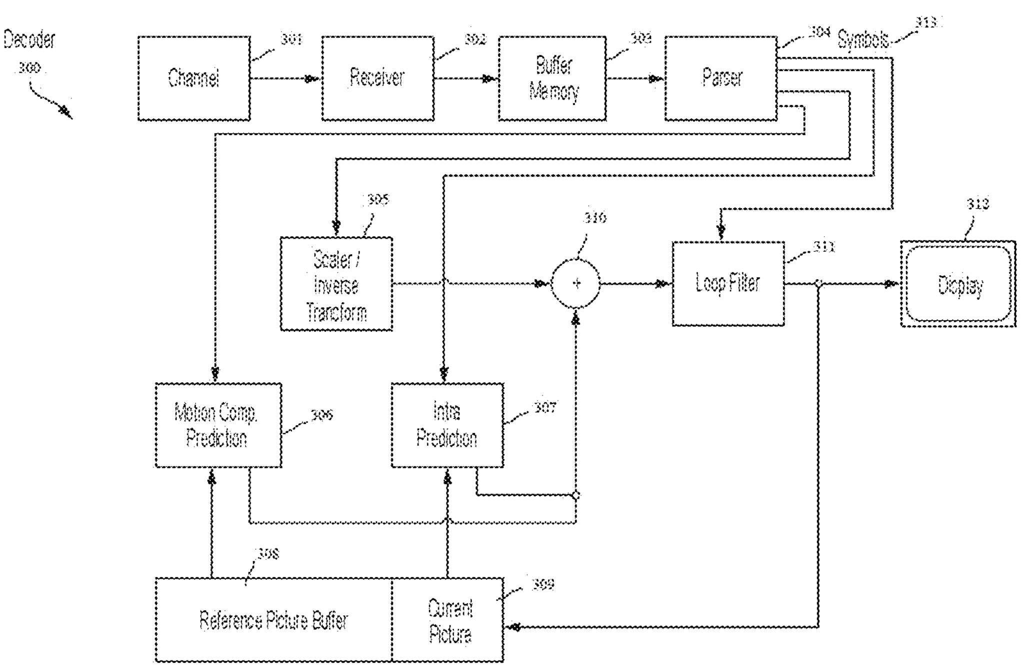
FIG. 3 is a simplified illustration of decoding in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.266. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
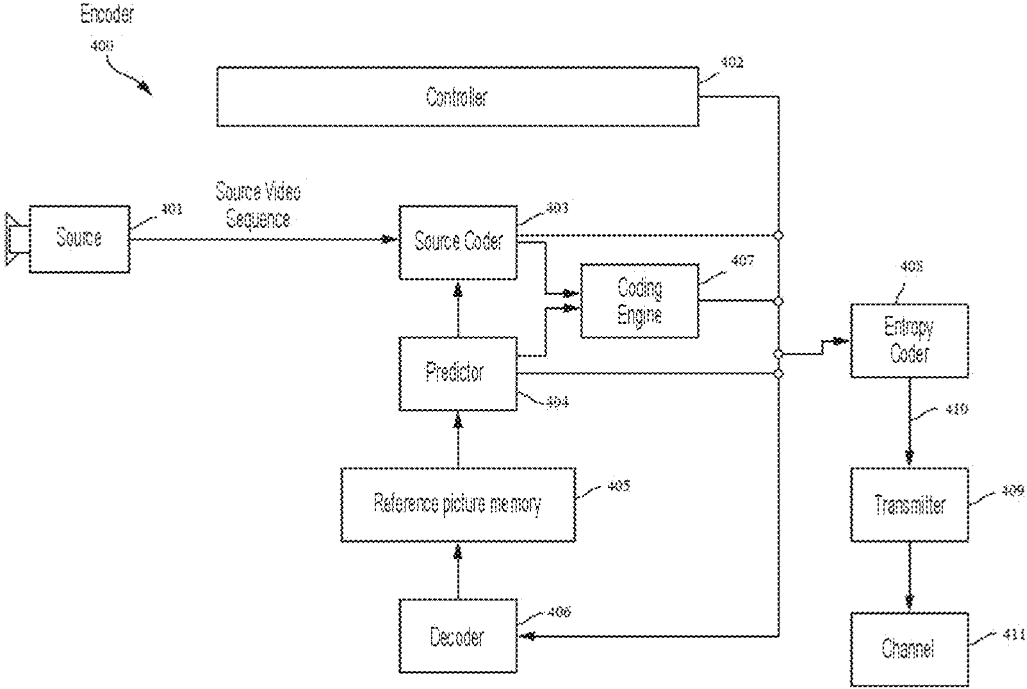
FIG. 4 is a simplified illustration of encoding in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 400 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture memory 405, which may be for example a cache. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the source coder 403, which may be for example a video coder, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the source coder 403 with other data to be transmitted, for example, coded audio data and/or ancillary data streams (sources not shown).

The controller 402 may manage operation of the encoder 400. During coding, the controller 402 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The encoder 400, which may be for example a video coder, may perform coding operations according to a predetermined video coding technology or standard, such as ITU-T Rec. H.266. In its operation, the encoder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Compressed video can be augmented, in the video bitstream, by supplementary enhancement information, for example in the form of Supplementary Enhancement Information (SEI) Messages or Video Usability Information (VUI). Video coding standards can include specifications parts for SEI and VUI. SEI and VUI information may also be specified in stand-alone specifications that may be referenced by the video coding specifications.

Referring to the example 500 of FIG. 5, shown is an exemplary layout of a Coded Video Sequence (CVS) in accordance with H.266. The coded video sequence is subdivided into Network Abstraction Layer units (NAL units). An exemplary NAL unit 501 can include a NAL unit header 502, which in turn comprises 16 bits as follows: a forbidden_zero_bit 503 and nuh_reserved_zero_bit 504 may be unused by H.266 and may be zero in a NAL unit. compliant with H.266. Three bits of nuh_layer_id 505 may be indicative of the (spatial, SNR, or multiview enhancement) layer to which the NAL unit belongs. Five bits of nuh_nal_unit_type define the type of NAL unit. In H.266, 22 NAL unit type values are defined for NAL unit types defined in H.266, six NAL unit types are reserved, and four NAL unit type values are unspecified and can be used by specifications other than H.266. Finally, three bits of the NAL unit header indicate the temporal layer to which the NAL unit belongs nuh_temporal_id_plus1 506.

A coded picture may contain one or more Video Coding Layer (VCL) NAL units and zero or more non-VCL NAL units. VCL NAL units may contain coded data conceptually belonging to a video coding layer as introduced before. Non-VCL NAL units may contain data conceptually belonging data not conceptually belonging to the video coding layer. Using H.266 as an example, they can be categorized into (1) Parameter sets, (2) Picture Header (PH_NUT), (3) NAL units, (4) Prefix and Suffix SEI Nal unit types (PREFIX_SEI_NUT and SUFFIX_SEI_NUT), (5) Filler Data NAL unit type FD_NUT, and (6) Reserved and Unspecified NAL unit types, as follows.

(1) Parameter sets, which comprise information that can be necessary for the decoding process and can apply to more than one coded picture. Parameter sets and conceptually similar NAL units may be of NAL unit types such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and staying constant throughout a coded video sequence CVS), PPS_NUT (Picture Parameter Set (PPS), establishing, among other things, parameter used and staying constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH_NUT), which is also a "normative" NAL unit.

(3) NAL units marking certain places in a NAL unit stream. Those include NAL units with the NAL unit types AUD_NUT (Access Unit Delimiter), EOS_NUT (End of Sequence) and EOB_NUT (End of Bitstream). These are non-normative, also known as informative, in the sense that a compliant decoder does not require them for its decoding process, although it needs to be able to receive them in the NAL unit stream.

(4) Prefix and Suffix SEI Nal unit types (PREFIX_SEI_NUT and SUFFIX_SEI_NUT) which indicate NAL units containing Prefix and Suffix supplementary enhancement information. In H.266, those NAL units are informative, as they are not required for the decoding process.

(5) Filler Data NAL unit type FD_NUT indicates filler data; data that can be random and can be used to "waste" bits in a NAL unit stream or bitstream, which may be necessary for the transport over certain isochronous transport environments.

(6) Reserved and Unspecified NAL unit types.

Still referring to FIG. 5, shown is a layout of a NAL unit stream in decoding order 510 containing a coded picture 511 containing NAL units of some of the types previously introduced. Somewhere early in the NAL unit stream, DCI 512, VPS 513, and SPS 514 may, in combination, establish the parameters which the decoder can use to decode the coded pictures of a coded video sequence (CVS), including coded picture 511 of the NAL unit stream.

The coded picture 511 can contain, in the depicted order or any other order compliant with the video coding technology or standard in use (here: H.266): a Prefix APS 516, Picture header (PH) 517, prefix SEI 518, one or more VCL NAL units 519, and suffix SEI 520.

Prefix and suffix SEI NAL units 518 and 520 were motivated during the standards development as, for some SEI messages, the content of the message would be known before the coding of a given picture commences, whereas other content would only be known once the picture were coded. Allowing certain SEI messages to appear early or late in a coded picture's NAL unit stream through prefix and suffix SEIs allows avoiding buffering. As one example, in an encoder the sampling time of a picture to be coded is known before the picture is coded, and hence the picture timing SEI message can be a prefix SEI message 516. On the other hand, a decoded picture hash SEI message, which contains a hash of the sample values of a decoded pictures and can be useful, for example, to debug encoder implementations, is a suffix SEI message 518 as an encoder cannot calculate a hash over reconstructed samples before a picture has been coded. The location of Prefix and Suffix SEI NAL units may not be restricted to their position in the NAL unit stream. The phrase "Prefix" and "Suffix" may imply to what coded pictures or NAL units the Prefix/Suffix SEI message may pertain to, and the details of this applicability may be specified, for example in the semantics description of a given SEI message.

Still referring to FIG. 5, show is a simplified syntax diagram of a NAL unit that contains a prefix or suffix SEI message 520. This syntax is a container format for multiple SEI messages that can be carried in one NAL unit. Details of the emulation prevention syntax specified in H.266 are omitted here for clarity. As other NAL units, SEI NAL units start with a NAL unit header 521. The header is followed by one or more SEI messages; two are depicted 530, 531 and described henceforth. Each SEI message inside the SEI NAL unit includes an 8 bit payload_type_byte 522 which specifies one of 256 different SEI types; an 8 bit payload_size_byte 523 which specifies the number of bytes of the SEI payload, and payload_size-byte number of bytes Payload 524. This structure can be repeated until a payload_type_byte equal to 0xff is observed, which indicates the end of the NAL unit. The syntax of the Payload 524 depends on the SEI message, it can be of any length between 0 and 255 bytes.

Figure 6:
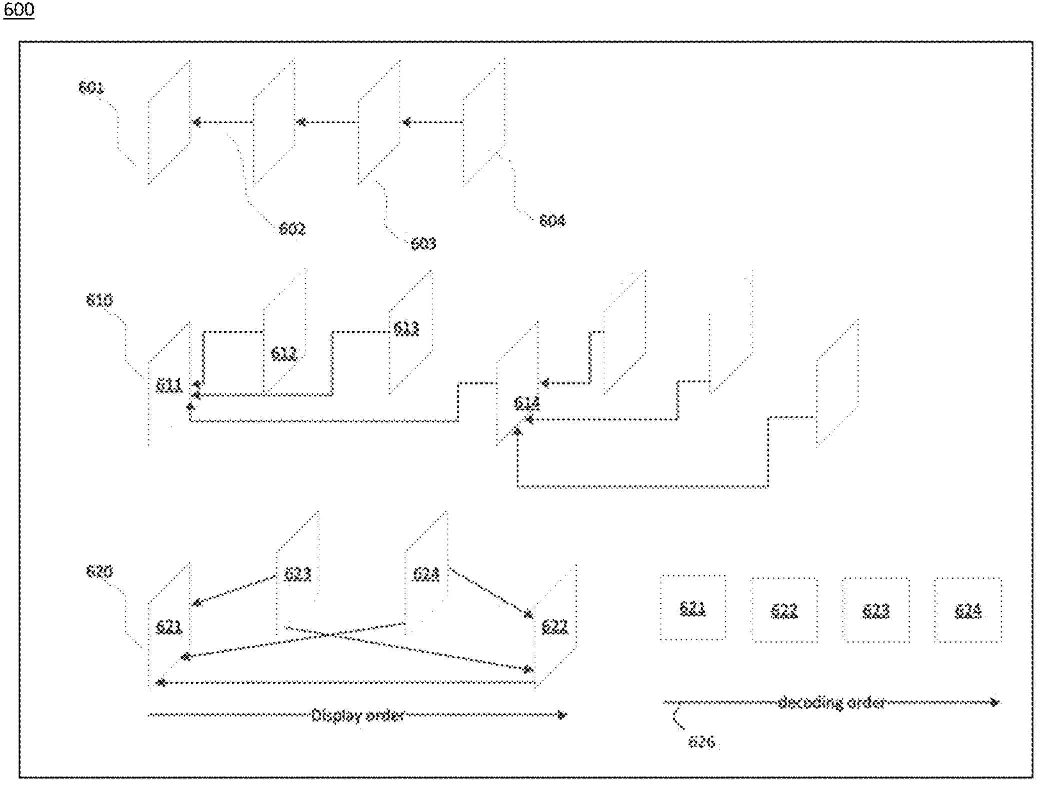
FIG. 6 is a schematic illustration of prediction structures in accordance with an embodiment.

Referring to the example 600 of FIG. 6, shown are temporal prediction structures. Encoders may have full control over the temporal prediction structures when coding a video sequence into a video bitstream. Encoder creating coded bitstreams according to video coding standards such as any of H.264, H.265, H.266 can, for example, create a prediction structure 601 where all pictures depend on their respective predecessor. Dependencies are depicted as arrows 602 throughout FIG. 6. In such a situation, even if multiple decoders were available, those multiple decoders could not be employed in parallel, because each picture's decoding requires its immediate predecessor to be available in decoded form. For example, picture 604 requires picture 604 for decoding, hence they cannot be decoded in parallel.

However, there are other prediction structures where pictures may be independent. For example, the prediction structure 610 may include multiple picture 612, 613, 614 that depend on one given picture 611. Picture 611 precedes pictures 611, 612, 613 in decoding order. Pictures 612, 613, and 614 are not dependent from each other and only depend on picture 611. In such a scenario pictures 612, 613 and 614 can be decoded independently from each other as long as picture 611 is available for their decoding. In a system with parallel decoders, pictures 612, 613, 614 can be assigned to independent decoder and decoded in parallel.

A person skilled in the art can trivially generalize the above observations to more complex prediction structures, and prediction from more than one reference picture (be it on a per picture or per block basis). For example, in certain systems compliant with MPEG-2, a prediction structure 620 was common, where B-pictures 621, 622 depended on two anchor P pictures 623, 624 that commonly were located in the past and future of pictures 621, 622 respectively (as depicted here), but preceded those three pictures in decoding order as depicted in the coded bitstream representation 626.

Still referring to FIG. 6, in order to enable, for example, parallel decoding of coded pictures that are independent from each other, such knowledge needs to be established so that a dispatcher can involve multiple decoders in the decoding of the bitstream. Ideally, such knowledge needs to be in a bitstream structure that is easily parsable. For example, no detailed bitstream analysis should be necessary to identify picture-to-picture dependency. However, and encoder can insert metadata into the bitstream that includes such information.

In an embodiment, and referring to the example 700A and 700B of FIGS. 7A and 7B, shown are syntax 701 and semantics 710 for an inter-picture dependency SEI message. The semantics of ipd_update_flag 702 and simultaneous_decoded_picture_minus1 703 are described in the respective semantics section 711 and 712 and discussed more below. The semantics of current_picture_independent 713 is also described. Phrased differently, current_picture_independent is an variable-length coded unsigned integer that signals the number of previous pictures in decoding order on which the current picture does not depend. Briefly referring to FIG. 6, current_picture_independent for picture 612 would be 0, for picture 613 would be 1, and for picture 614 would be 2.

One advantage of this mechanism is its ease of implementation, as all control information to identify independent pictures is present in an easily parseable SEI message. However, if in a transmission chain, independently decodable pictures are removed from the bitstream-intentionally by a middlebox because of, for example, network congestion, or unintentionally through network or transmission errors, then the relative addressing using the current_picture_independent mechanism would be misleading as the decoder has no knowledge that a picture may be dropped by the transmission chain that's counted by the current_picture_independent mechanism.

In the same or another embodiment, the semantics of current_picture_independent could refer to differences in picture_order_count_lsb instead of a count of the number of pictures as described above. Picture order count (POC) may be a mechanism that codecs such as HEVC and VVC use internally for reference picture management, and may be present in high level syntax structures such as the slice header or the picture header. Picture order count may allow for a unique (within the value range of the MSB byte of POC—256 pictures) identification of a picture in a CVS. Given practical CVS sizes that hardly are larger than 50 pictures POC can be assumed as a unique identifier of a picture in a CVS. POC also may monotically increase (until wrap-around) in decoding order. Insofar, referring to a POC value rather than to a number of decoded previous pictures may allow for the addressing in an absolute (instead of a relative) picture identification, which in turn may have better error resilience properties. The cost for this resilience may be a) coding efficiency, as POC becomes larger with time and so would be variable length codewords referring to POC, and b) implementation complexity, as identifying POC may require parsing complex, bit-oriented header structures such as the slice or picture header.

In an embodiment, referring to example 900 of FIG. 9, at the expense of additional overhead in the SEI message and at the expense of potentially sending more SEI messages than necessary using the previous mechanism, the aforementioned shortcomings in error resilience and the aforementioned implementation complexity issues related to POC may be avoided by explicitly indicating a picture identification in the SEI message, as well as an indication which pictures are independent from certain other pictures. Specifically, in the syntax 901, the ipd_update_flag mechanism 902 can be the same as previously described. The SEI message further may include a current_picture_serial_number coded, for example, as an 8 bit unsigned integer 903 with semantics 905, and a picture_dependency_serial_number 904, also coded as an 8 bit unsigned integer, with semantics 906. Using this syntax and semantics, and ignoring the wrap-around when monotically increasing the current_picture_serial_number by 1 for each coded picture, the identification of dependent picture is based on absolute rather than relative numbers, and hence may work even if an independent picture gets lost or damaged. However, for best error resilience properties, the SEI message would need to be present in every picture in the CVS, leading to a certain overhead.

Figure 8:
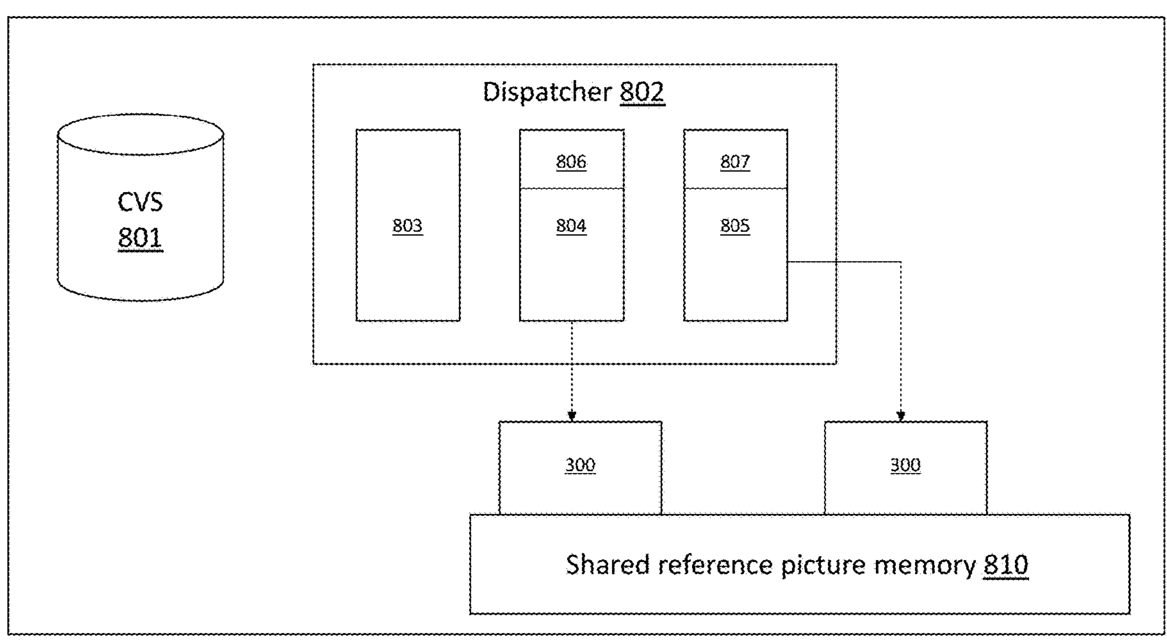
FIG. 8 is a schematic illustration of prediction structures in accordance with an embodiment.

Referring to example 800 of FIG. 8, a system taking advantage of aforementioned signaling based on inter-picture dependency SEI messages available in at least some pictures could be implemented as follows.

A coded video bitstream 801 can be first buffered and analyzed by a dispatcher 802. The dispatcher 802 can specifically scan coded pictures 803, 804, 805 of the bitstream 801 for the presence of inter_picture_dependency_SEI messages 806, 807, and extract and parse those. In this example, picture 803 may not include an inter_picture_dependency_SEI. Based on the content of such SEI messages 806, 807, the dispatcher 802 can decide whether a given picture carrying the SEI message can be decoded independently from the previous picture(s). If so, the dispatcher 802 can copy the coded picture, for example picture 804 from its buffer to an available picture decoder 808. It can further copy coded picture 805 that has been identified as independent from picture 804 through analyzing of SEI messages 806, 807 to the available picture decoder 809. Picture decoders 808 and 809 can, potentially in parallel, decode pictures 804 and 805. Picture decoders 808 and 809 share reference picture memory 810 to store reconstructed pictures and associated metadata for future processing.

So, in other words, nowadays, video applications rely more and more on mixed hardware/software-based implementations, particularly for decoders/transcoders located in the Cloud. Such cloud media processing benefits from massive parallel computing resources such as GPUs. In many scenarios, the decoding process needs to happen as fast as possible. As an example, live TV programs that are later proposed as on-demand contents, need to be made available as soon as possible. The TV program from the live stream is decoded and re-encoded into multiple formats and resolutions suitable for on-demand streaming. And embodiments herein address the fast-decoding mode by signaling pictures that can be decoded independently.

When decoding a video bitstream, a single decoder instance is usually set up. All the picture units are decoded sequentially with parallelized decoding opportunities only at the lower levels under some constraints.

This is explained by the fact that pictures within the same CVS have some dependencies such as decoded pictures used as a reference for later ones (in coding order).

Within a Picture Unit:

Sub-pictures may be decoded in parallel within the same Picture Unit.

Tiles could also be parallelized if cross-tiles prediction and entropy dependencies are prevented.

Slices contained in a same Picture Unit, could be parallelized after entropy decoding, if no inter slice dependency is guaranteed.

Wavefront Parallel Processing (WPP) also allows creation of picture partitions that can be processed in parallel.

However, inter-picture dependency is not signaled at the high level whereas some pictures may be decoded without waiting all the previous ones to be decoded.

Nowadays, encoders are much more complex than decoders and some of them already use per-picture parallelization for encoding speed efficiency. To do so, some inter-picture restrictions are necessary, thus impacting the prediction structure of the CVS. Those restrictions in terms of inter-picture dependency are not signaled today and visible from a decoder viewpoint.

Figure 10:
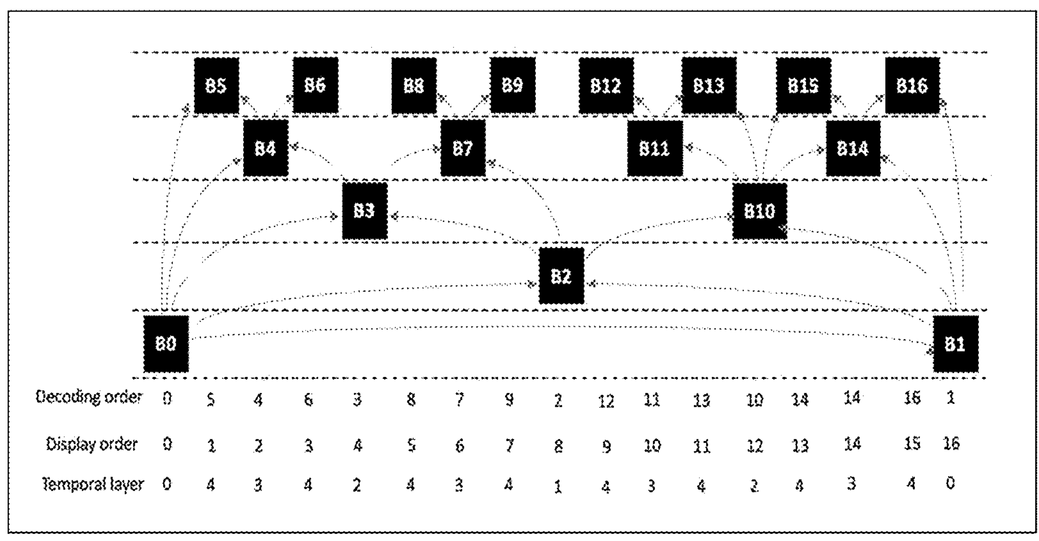
FIG. 10 is a schematic illustration of prediction structures in accordance with an embodiment.

The examples 1000 and 1100 of FIGS. 10 and 11 illustrate an example of a coding configuration.

In this configuration, the pictures B0, B1, B2, B3, B4 and B5 need to be decoded sequentially as they potentially depend on each other. The picture B6 can be decoded in parallel of picture B5. To enable such a process, the picture B6 needs to signal that the previous one is independent from it. The pictures B6 and B7 are also independent from each other and only rely on the availability of the picture B3. It is then interesting to signal the latest picture required to be available prior to the decoding of the current picture.

In this scenario, the decoding process of the GOP can be optimized with 3 decoder instances acting like the example 1100.

With the assumption that the decoding time of a frame being constant, the theoretical decoding speed may be significantly faster. This approach is even more efficient with larger GOP sizes.

Picture Unit parallelization can be further optimized each time the following picture in decoding order does not use the current one, even if the current one is flagged as a reference picture for the following one. This could be a choice of an encoder implementation to favor inter-picture parallel processing at both the encoder and decoder sides.

Figure 12:
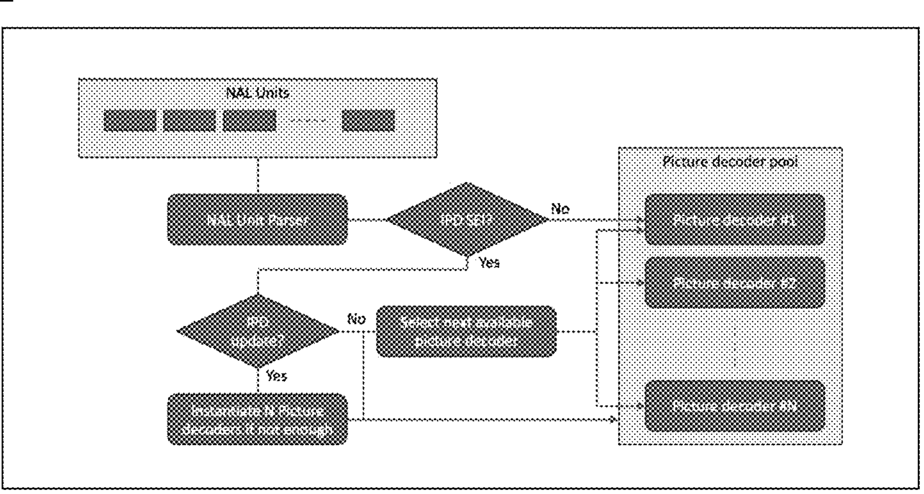
FIG. 12 is a schematic illustration of prediction structures in accordance with an embodiment.

To prepare the decoding configuration, it is necessary to indicate the number of picture decoder instances to be instantiated. A possible decoder architecture is described in the example 1200 of FIG. 12. But, to useful, the indication of picture dependency needs to be known as early as possible in the decoder process. For this reason, the definition of an associated SEI message implies the need to be a Prefix SEI (NAL Unit type: PREFIX_SEI_NUT).

As an example of VSEI Inter picture dependency SEI message syntax, see the example 1400 of FIG. 14 which regards signaling picture dependency and recommended decoder instance according to embodiments herein.

And see the example 1500 of FIG. 15 which regards signaling picture dependency using POC according to embodiments herein.

And see the example 1600 of FIG. 16 which regards signaling picture dependency using a serial number according to embodiments herein.

And in light of the above according to embodiments herein, the Inter Picture Dependency (IPD) SEI message carries parameters allowing to decode more than one picture unit simultaneously Use of this SEI message requires the definition of the following variables:

Let NbPictureDecoders be the number of picture decoder instances used to decode the bitstream.

At initialization, NbPictureDecoders is equal to 1.

The picture decoder instances initialization that signals the number of parallel picture decoder instances expected to run within the CVS.

ipd_update_flag equal to 0 indicates that the number of simultaneous picture decoders information is not present and the simulataneous_decoded_picture_minus1 is assumed to be equal to zero.

idp_update_flag equal to 1 indicates that the number of simultaneous picture decoders information is present and signaled in simulataneous_decoded_picture_minus1.

simulataneous_decoded_picture_minus1 signals the maximum number of picture decoder instances minus one, that are expected to run simultaneously.

When simulataneous_decoded_picture_minus1 is present:

$$NbPictureDecoders = \text{Max}(\text{simulataneous\_decoded\_picture\_minus1} + 1,\ NbPicureDecorders)$$

If unchanged, NbPictureDecoders remains valid until the end of the current CVS.

So, with the example 1400:

current_picture_dependency_id indicates if the current picture is independent from the previous one in decoding order. current_picture_dependency_id also carries the identifier of the picture decoder instance that may be used to decode the corresponding picture unit.

current_picture_dependency_id equal to 0 indicates that the current picture unit requires the availability the decoded previous picture in decoding order.

current_picture_dependency_id different from 0 indicates that the current picture unit can be decoded without waiting the availability of the decoded previous picture in decoding order. In this case, current_picture_independent carries the identifier of the picture unit decoder instance that may be used.

And with the example 1500, current_picture_dependency_id indicates the picture order count of the latest picture in decoding order required to be available for decoding the current picture unit. And current_picture_dependency_id is equal to ph_pic_order_cnt_lsb from the picture unit header of the latest picture required to be decoded prior to decoding the current picture unit.

And with the example 1600, let SerialNumber be a one-byte integer identifier of the picture. At the start of a CVS, the first picture unit is assigned SerialNumber equal to 0. For each following picture in the decoding order in the CVS SerialNumber is incremented by one. A wraparound is applied to SerialNumber so that the following value after 255 is 0. The current_picture_serial_number indicates the serial number of the current picture unit. And picture_dependency_serial_number indicates the serial number of the latest picture in decoding order required to be decoded before being able to decode the current picture unit.

And FIG. 16 illustrates an example according to embodiments herein regarding HEVC and VVC general SEI payload syntax.

So, in light of the above, the techniques for SEI message supporting decoder picture-based parallelization, described above, can be implemented as computer software using computer-readable instructions and physically stored in one or more computer-readable media. For example, FIG. 17 shows a computer system 1700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 17 for computer system 1700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1700.

Computer system 1700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1701, mouse 1702, trackpad 1703, touch screen 1710, joystick 1705, microphone 1706, scanner 1708, camera 1707.

Computer system 1700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1710, or joystick 1705, but there can also be tactile feedback devices that do not serve as input devices), audio output devices (such as: speakers 1709, headphones (not depicted)), visual output devices (such as screens 1710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1700 can also include human accessible storage devices and their associated media such as optical media including CD/DVD ROM/RW 1720 with CD/DVD 1711 or the like media, thumb-drive 1722, removable hard drive or solid state drive 1723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1700 can also include interface 1799 to one or more communication networks 1798. Networks 1798 can for example be wireless, wireline, optical. Networks 1798 can further be local, wide-area, metropolitan, vehicular and industrial, real-time, delay-tolerant, and so on. Examples of networks 1798 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1798 commonly require external network interface adapters that attached to certain general-purpose data ports or peripheral buses (1750 and 1751) (such as, for example USB ports of the computer system 1700; others are commonly integrated into the core of the computer system 1700 by attachment to a system bus as described below (for example Ethernet interface into a PC computer system or cellular network interface into a smartphone computer system). Using any of these networks 1798, computer system 1700 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1740 of the computer system 1700.

The core 1740 can include one or more Central Processing Units (CPU) 1741, Graphics Processing Units (GPU) 1742, a graphics adapter 1717, specialized programmable processing units in the form of Field Programmable Gate Areas (FPGA) 1743, hardware accelerators for certain tasks 1744, and so forth. These devices, along with Read-only memory (ROM) 1745, Random-access memory 1746, internal mass storage such as internal non-user accessible hard drives, SSDs, and the like 1747, may be connected through a system bus 1748. In some computer systems, the system bus 1748 can be accessible in the form of one or more physical plugs to enable extensions by additional CPUs, GPU, and the like. The peripheral devices can be attached either directly to the core's system bus 1748, or through a peripheral bus 1749. Architectures for a peripheral bus include PCI, USB, and the like.

CPUs 1741, GPUs 1742, FPGAs 1743, and accelerators 1744 can execute certain instructions that, in combination, can make up the aforementioned computer code. That computer code can be stored in ROM 1745 or RAM 1746. Transitional data can be also be stored in RAM 1746, whereas permanent data can be stored for example, in the internal mass storage 1747. Fast storage and retrieval to any of the memory devices can be enabled through the use of cache memory, that can be closely associated with one or more CPU 1741, GPU 1742, mass storage 1747, ROM 1745, RAM 1746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1700, and specifically the core 1740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1740 that are of non-transitory nature, such as core-internal mass storage 1747 or ROM 1745. The software implementing various embodiments of the present disclosure can be stored in such devices and executed by core 1740. A computer-readable medium can include one or more memory devices or chips, according to particular needs. The software can cause the core 1740 and specifically the processors therein (including CPU, GPU, FPGA, and the like) to execute particular processes or particular parts of particular processes described herein, including defining data structures stored in RAM 1746 and modifying such data structures according to the processes defined by the software. In addition or as an alternative, the computer system can provide functionality as a result of logic hardwired or otherwise embodied in a circuit (for example: accelerator 1744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method for video decoding, the method including: obtaining video data comprising at least a first coded picture and a second coded picture; identifying, by a decoder, at least one syntax element in a supplementary information enhancement (SEI) message indicating that the second coded picture is to be decoded independently from the first picture; and decoding the second coded picture independently from the first coded picture based on the at least one syntax element in the SEI message.

(2) The method of feature (1), in which the SEI message is included with the second coded picture in the video data.

(3) The method of any of features (1) to (2), in which the decoder comprises a plurality of decoders, and decoding the second coded picture independently from the first coded picture based on the at least one syntax element in the SEI message comprises a first one of the plurality of decoders decoding the first coded picture and a second one of the plurality of decoders decoding the second coded picture.

(4) The method of any of features (1) to (3), in which the first one of the plurality of decoders decodes the first coded picture in parallel with the second one of the plurality of decoders decoding the second coded picture.

(5) The method of any of features (1) to (4), in which the at least one syntax element in the SEI message indicates picture dependency and a recommended decoder instance for decoding the second coded picture.

(6) The method of any of features (1) to (6), in which the at least one syntax element in the SEI message indicates picture dependency based on a picture order count (POC).

(7) The method of any of features (1) to (7), in which the at least one syntax element in the SEI message indicates picture dependency based on a serial number.

(8) A method for video encoding, the method including: obtaining video data comprising a first picture and a second picture; and encoding the video data to encoded video data comprising at least a first coded picture and a second coded picture and indicating to identify at least one syntax element in a supplementary information enhancement (SEI) message, of the encoded video data, indicating that the second coded picture is to be decoded independently from the first picture.

(9) The method of feature (1), in which the SEI message is included with the second coded picture in the video data.

(10) The method of any of features (8) to (9), in which the encoded video data indicates to process the second coded picture independently from the first coded picture based on the at least one syntax element in the SEI message indicates a first one of the plurality of decoders decoding the first coded picture and a second one of the plurality of decoders decoding the second coded picture.

(11) The method of any of features (8) to (10), in which the first one of the plurality of decoders is configured to decode the first coded picture in parallel with the second one of the plurality of decoders decoding the second coded picture.

(12) The method of any of features (8) to (11), in which the at least one syntax element in the SEI message indicates picture dependency and a recommended decoder instance for decoding the second coded picture.

(13) The method of any of features (8) to (12), in which the at least one syntax element in the SEI message indicates picture dependency based on a picture order count (POC).

(14) The method of any of features (8) to (13), in which the at least one syntax element in the SEI message indicates picture dependency based on a serial number.

(15) A method of processing visual media data, the method including: performing a conversion between a visual media file and a bitstream of a visual media data according to a format rule, wherein the format rule indicates to identify at least one syntax element in a supplementary information enhancement (SEI) message indicating that the second coded picture is to be decoded independently from the first picture.

(16) The method of feature (15), in which wherein the SEI message is included with the second coded picture in the video data.

(17) The method of any of features (15) to (16), in which decoding the second coded picture independently from the first coded picture based on the at least one syntax element in the SEI message comprises a first one of the plurality of decoders decoding the first coded picture and a second one of the plurality of decoders decoding the second coded picture.

(18) The method of any of features (15) to (17), in which the first one of the plurality of decoders is configured to decode the first coded picture in parallel with the second one of the plurality of decoders decoding the second coded picture.

(19) The method of any of features (15) to (18), in which wherein the at least one syntax element in the SEI message indicates picture dependency and a recommended decoder instance for decoding the second coded picture.

(20) The method of any of features (15) to (19), in which wherein the at least one syntax element in the SEI message indicates picture dependency based on any of a picture order count (POC) and on a serial number.

(21) An apparatus for video decoding, including processing circuitry that is configured to perform the method of any of features (1) to (7).

(22) An apparatus for video encoding, including processing circuitry that is configured to perform the method of any of features (8) to (15).

(23) A non-transitory computer-readable storage medium storing instructions which when executed by at least one processor cause the at least one processor to perform the method of any of features (1) to (20).

What is claimed is:

1. A method for video decoding, the method comprising:

obtaining video data comprising at least a first coded picture and a second coded picture;

identifying, by a decoder, at least one syntax element in a supplementary information enhancement (SEI) message indicating that the second coded picture is to be decoded independently from the first picture, and the at least one syntax element in the SEI message further indicates picture dependency and a recommended decoder instance for decoding the second coded picture; and decoding the second coded picture independently from the first coded picture based on the at least one syntax element in the SEI message.

2. The method according to claim 1, wherein the SEI message is included with the second coded picture in the video data.

3. The method according to claim 1, wherein the decoder comprises a plurality of decoders, and wherein decoding the second coded picture independently from the first coded picture based on the at least one syntax element in the SEI message indicating a first one of the plurality of decoders decoding the first coded picture and a second one of the plurality of decoders, which is the recommended decoder instance, decoding the second coded picture.

4. The method according to claim 3, wherein the first one of the plurality of decoders decodes the first coded picture in parallel with the second one of the plurality of decoders decoding the second coded picture.

5. The method according to claim 1, wherein the at least one syntax element in the SEI message indicates the picture dependency and the recommended decoder instance for decoding the second coded picture by a syntax of "current_picture dependency_id".

6. The method according to claim 1, wherein the at least one syntax element in the SEI message further indicates picture dependency based on a picture order count (POC).

7. The method according to claim 1, wherein the at least one syntax element in the SEI message further indicates picture dependency based on a serial number.

8. A method for video encoding, the method comprising:

obtaining video data comprising a first picture and a second picture; and encoding the video data to encoded video data comprising at least a first coded picture and a second coded picture and indicating to identify at least one syntax element in a supplementary information enhancement (SEI) message, of the encoded video data, indicating that the second coded picture is to be decoded independently from the first picture, and the at least one syntax element in the SEI message further indicates picture dependency and a recommended decoder instance for decoding the second coded picture.

9. The method according to claim 8 wherein the SEI message is included with the second coded picture in the video data.

10. The method according to claim 8, wherein the encoded video data indicates to process the second coded picture independently from the first coded picture based on the at least one syntax element in the SEI message indicating a first one of the plurality of decoders decoding the first coded picture and a second one of the plurality of decoders, as the recommended decoder instance, decoding the second coded picture.

11. The method according to claim 10, wherein the first one of the plurality of decoders is configured to decode the first coded picture in parallel with the second one of the plurality of decoders decoding the second coded picture.

12. The method according to claim 8, wherein the at least one syntax element in the SEI message indicates picture dependency and the recommended decoder instance for decoding the second coded picture by a syntax of "current_picture dependency_id".

13. The method according to claim 8, wherein the at least one syntax element in the SEI message further indicates picture dependency based on a picture order count (POC).

14. The method according to claim 8, wherein the at least one syntax element in the SEI message further indicates picture dependency based on a serial number.

15. A non-transitory computer-readable storage medium storing a video bitstream that is generated by a video encoding method, the video encoding method comprising:

signaling at least one syntax element in a supplementary information enhancement (SEI) message in the video bitstream, the at least one syntax element indicating that a second coded picture is to be decoded independently from a first picture and the at least one syntax element in the SEI message further indicates picture dependency and a recommended decoder instance for decoding the second coded picture; and encoding video data to encoded video data comprising at least the first coded picture and the second coded picture.

16. The non-transitory computer-readable storage medium according to claim 15, wherein the SEI message is included with the second coded picture in the video data.

17. The non-transitory computer-readable storage medium according to claim 15, wherein decoding the second coded picture independently from the first coded picture based on the at least one syntax element in the SEI message indicating a first one of the plurality of decoders decoding the first coded picture and a second one of the plurality of decoders, which is the recommended decoder instance, decoding the second coded picture.

18. The non-transitory computer-readable storage medium according to claim 17, wherein the first one of the plurality of decoders is configured to decode the first coded picture in parallel with the second one of the plurality of decoders decoding the second coded picture.

19. The non-transitory computer-readable storage medium according to claim 15, wherein the at least one syntax element in the SEI message indicates picture dependency and a recommended decoder instance for decoding the second coded picture by a syntax of "current_picture_dependency id".

20. The non-transitory computer-readable storage medium according to claim 15, wherein the at least one syntax element in the SEI message further indicates picture dependency based on any of a picture order count (POC) and on a serial number.

* * * * *